United States Patent
Kittredge

[15] 3,679,147
[45] July 25, 1972

[54] INHERENT REWOUND FILM TRANSPORT SYSTEM

[72] Inventor: Raymond Edson Kittredge, Binghamton, N.Y.

[73] Assignee: The Singer Company, New York, N.Y.

[22] Filed: Sept. 18, 1970

[21] Appl. No.: 73,535

[52] U.S. Cl..............................242/55.18, 352/128
[51] Int. Cl...................................................B65h 17/48
[58] Field of Search............242/55.18, 55.21; 352/128

[56] References Cited

UNITED STATES PATENTS

| | | | |
|---|---|---|---|
| 2,443,248 | 6/1948 | Hurley | 242/55.18 X |
| 2,670,202 | 2/1954 | Gregg | 242/55.18 |
| 3,292,875 | 12/1966 | Rojic | 242/55.21 |
| 2,094,922 | 10/1937 | John | 242/55.18 |

Primary Examiner—Billy S. Taylor
Attorney—Francis L. Masselle, William Grobman and Charles S. McGuire

[57] ABSTRACT

A system for unwinding a motion picture film from a payoff or unwind cassette through a projector and winding the film on a takeup cassette in such a manner that the film is inherently rewound, whereby the takeup cassette may be immediately used as the payoff cassette. The film is unwound from the center toward the outside of the payoff cassette, and is wound on a collapsable, removable core within a cassette which includes means for firmly holding and centering the outside of a completely wound coil of film. Also disclosed are means for automatically handling the film reels or cassettes from storage to payoff to windup positions and to automatically handle the leading end of the film to begin both threading into the projector and windup on the callapsable core.

8 Claims, 10 Drawing Figures

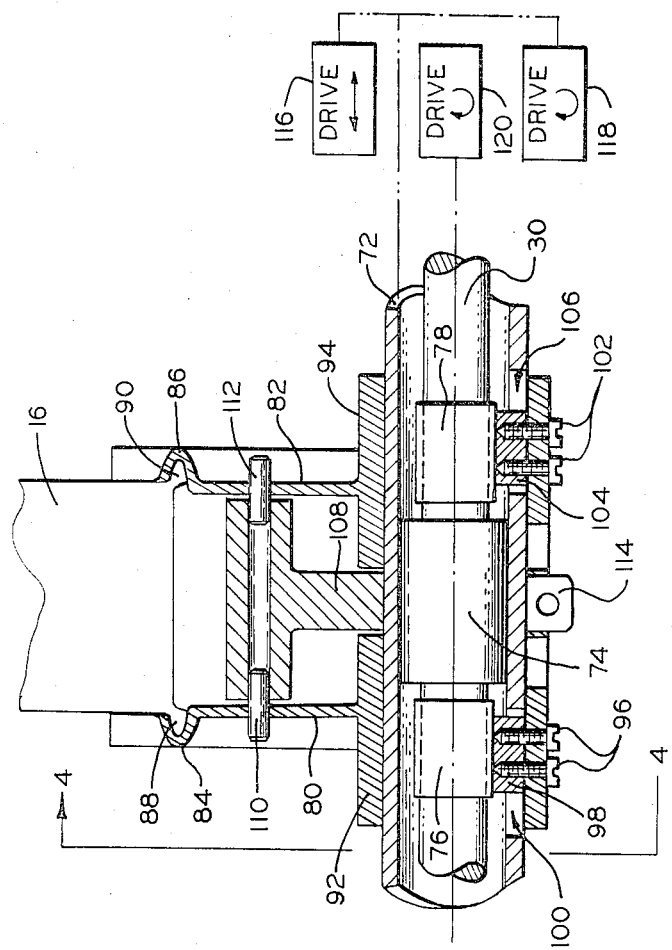
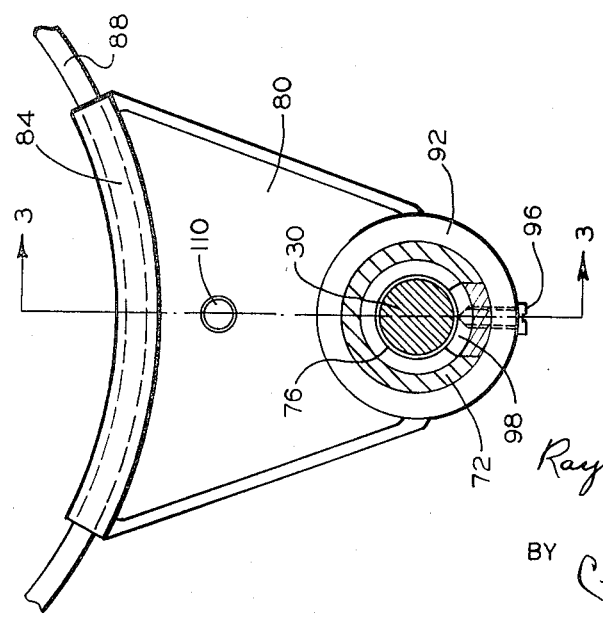
FIG. 3
FIG. 4
Raymond E. Kittredge
INVENTOR.
BY Charles S. McGuire
ATTORNEY INVENTOR.
Raymond E. Kittredge
BY
Charles S. McGuire
ATTORNEY ta
INHERENT REWOUND FILM TRANSPORT SYSTEM The present invention relates to motion picture film handling systems, and more specifically to means for unwinding a motion picture film from a payoff cassette, through a projector, and winding the film in a condition subject to immediate replay through the projector without the necessity of rewinding, in a completely automated fashion.

In certain applications of motion picture projection it is extremely important that idle time on the projector be kept to a minimum. For example, motion picture displays used to present a visual simulation of the real world in conjunction with fixed-base aviation trainers utilize a specialized, expensive film and idle time on the projector also means idle time on the flight simulator. Due to the cost and complexity of the latter, in addition to the visual simulation system used therewith, any idle time is very costly in terms of lost training value and non-utilization of equipment representing a high investment.

Although the present invention may be applied generally in the field of motion picture projection, it is particularly intended for use in systems such as those mentioned above, a typical example being the visual simulation system manufactured and sold under the trade name VAMP by the Link Division of Singer-General Precision, Inc. The projector mechanism used in such systems is essentially the same as conventional projectors used in other applications for similar film formats (commonly 70 mm), the apparent changes in the observer's viewpoint being produced by special projection and display optics. Since the present invention is concerned only with features of the film handling exterior to the projector, details of the latter will not be disclosed, many well-known examples being suitable for use with the invention.

A special cassette is used to hold the film in the usual, coiled state. As the film comes from the projector it is wound on a rotating core within a stationary outer shell having an opening through which the moving film enters. When the entire length of film is wound within the cassette, an expandable tube or bladder is inflated to the extent required to lodge firmly between the outer layer of the film roll and the inside of the cassette. The inner core is then collapsed and removed from the cassette, leaving the film roll hollow and unsupported at the center. The cassette may then be immediately placed in the unwind position on the projector, the leading end of the film removed from the center of the roll and threaded for transport through the projector again with no delay whatever. The film path is displaced laterally between the unwind cassette and the projector to the extent required for clearance and smooth transport. Completely automated means may be provided for moving the cassettes between windup and unwind positions, as well as to and from storage, and to thread the film into the projector and the windup cassette.

It is a principal object of the invention to provide a motion picture film transport system which allows immediate replay of a roll of film which has been run through a projector to a windup reel without the necessity of rewinding.

Another object is to provide a novel motion picture film cassette wherein a length of film may be wound on a central core and rerun from the leading end directly through the projector.

A further object is to provide a completely automated system for handling motion picture film through successive replays without rewinding.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 3 is a sectional view, along the line 3—3 of FIG. 4, of a cassette transport mechanism, showing a fragment of the cassette;

FIG. 4 is a sectional view on the line 4—4 of FIG. 3;

Figure 1:
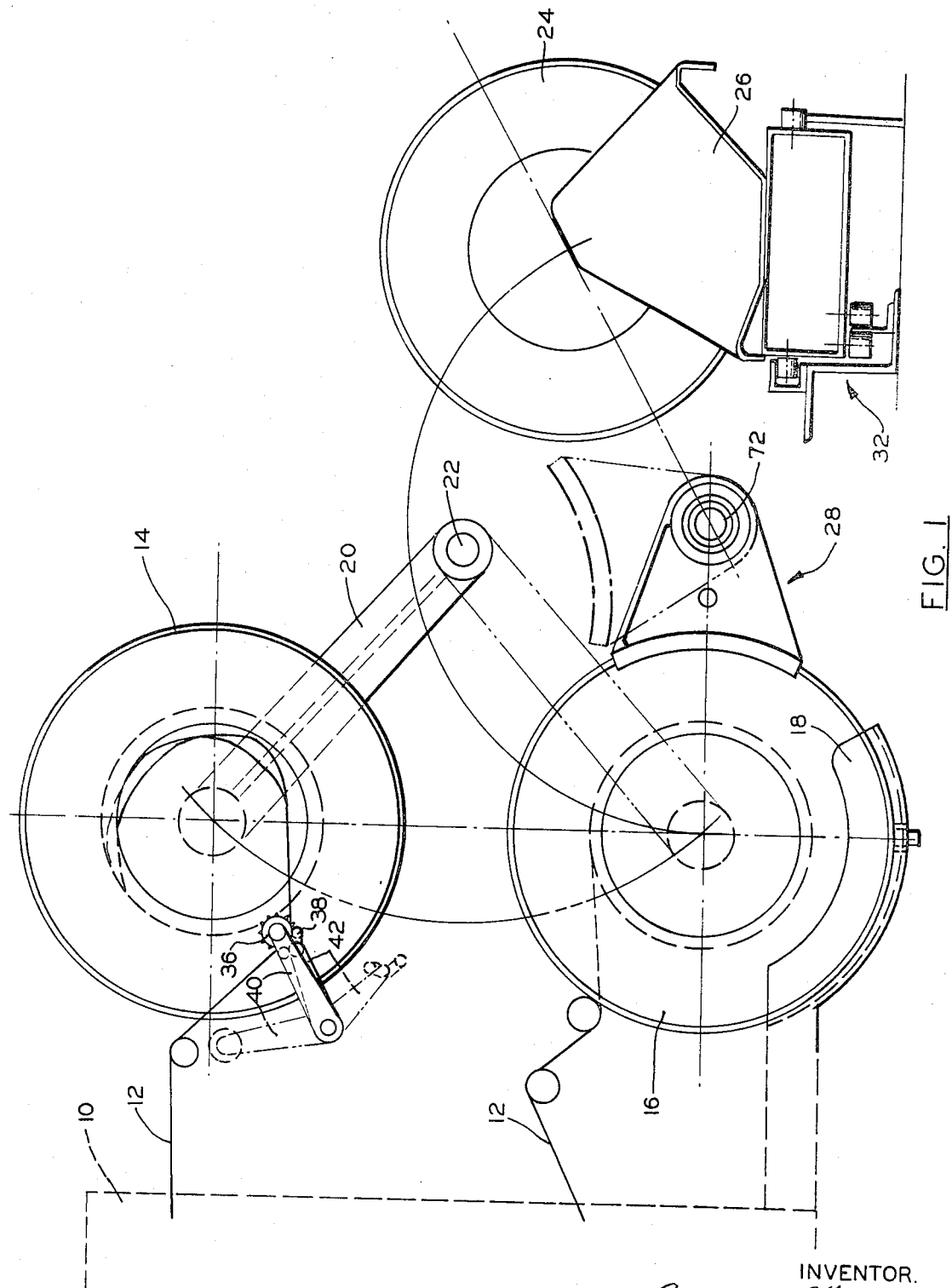
FIG. 1 is an elevational view showing certain elements of the invention in various positions of relative movement in operative relation to a motion picture projector.

In order to concentrate on the novel features of an operative embodiment of the invention, certain conventional elements such as bearings and other support means, motor drives, and the like, have been omitted or shown only schematically. It will be readily understood how various embodiments of such conventional elements may be applied as required to the operative elements of the invention. Also, as previously mentioned, details of the projector mechanical or optical construction form no part of the invention, and therefore the projector is indicated in FIG. 1 only by the dotted outline 10. Motion picture film strip 12 is unwound from a coil within cassette 14, fed through projector 10 in the usual manner for projection and display, and wound on a rotating core within cassette 16. Cassette 14 is rotated, in a manner to be described as film 12 is removed therefrom, and cassette 16 is held in a stationary position on support means 18 with the film entering cassette 16 through an opening properly aligned with projector 10 and wound into a coil by rotation of the central core.

Cassette 14 is supported in the "unwind position" shown in FIG. 1 by a chucking means attached to the end of arm 20 which is rotatable about support rod 22 between the positions shown in solid and dot-dash lines. The arc described by the center of the chucking means during such movement of arm 20 is also indicated in FIG. 1.

An additional film-holding cassette 24 is shown in FIG. 1, supported in storage rack 26 which may be provided for holding a number of such cassettes in properly spaced, side-by-side relation with axes parallel to those of cassettes 14 and 16 mounted in unwind and windup positions on projector 10. Cassette transport means 28, constructional details and operation of which are described in connection with FIGS. 3 and 4, is rotatable on suitable bearing means supporting hollow shaft 72 to move cassettes between storage rack 26 and the windup position. Transport means 28 is movable laterally as well as pivotally between two adjacent positions, and storage rack 26 is preferably also laterally movable on rollers and guides indicated generally by the reference numeral 32 to provide added automation capability. That is, lateral movement of rack 26 allows any of several cassettes, each holding a different film sequence, to be selectively aligned with the pick-up position of transport means 28, as explained more fully later herein.

Figure 9:
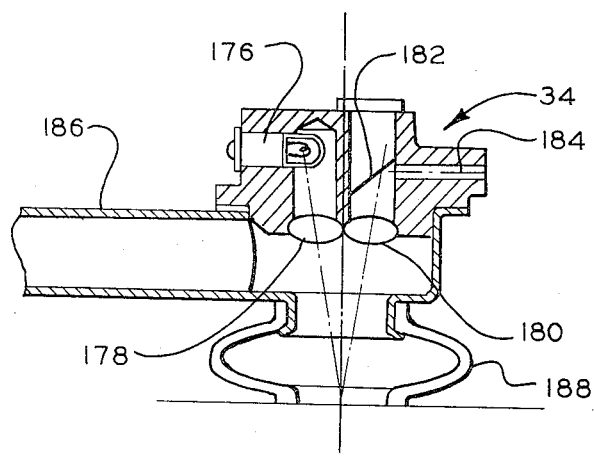
FIG. 9 is an elevational view in section of an embodiment of a film pick-up device which may be used with the invention.

Means are preferably provided for automatically removing the leading end of film 12 from cassette 14, threading it into and through projector 10, and into cassette 16 and beginning the winding of the film strip on the rotatable core therein. Pneumatic pick-up means 34, indicated generally in FIG. 2 and in more detail in FIG. 9 is mounted for reciprocal, vertical movement to vacuum engage the film leader at the inside of the coil and hold it for engagement by rotatable sprocket wheel 36 and rollers 38 mounted on the ends of pivotal arms 40 and 42, respectively. After the leading end of film 12 has been engaged and driven by sprocket 36, conventional automatic threading means of the type currently in use on many projectors, are employed to transport it properly into, through and out of projector 10 and into cassette 16. Additional vacuum pick-up means described later then engage the leader so that the film is wound on the rotatable core within cassette 16.

Figure 2:
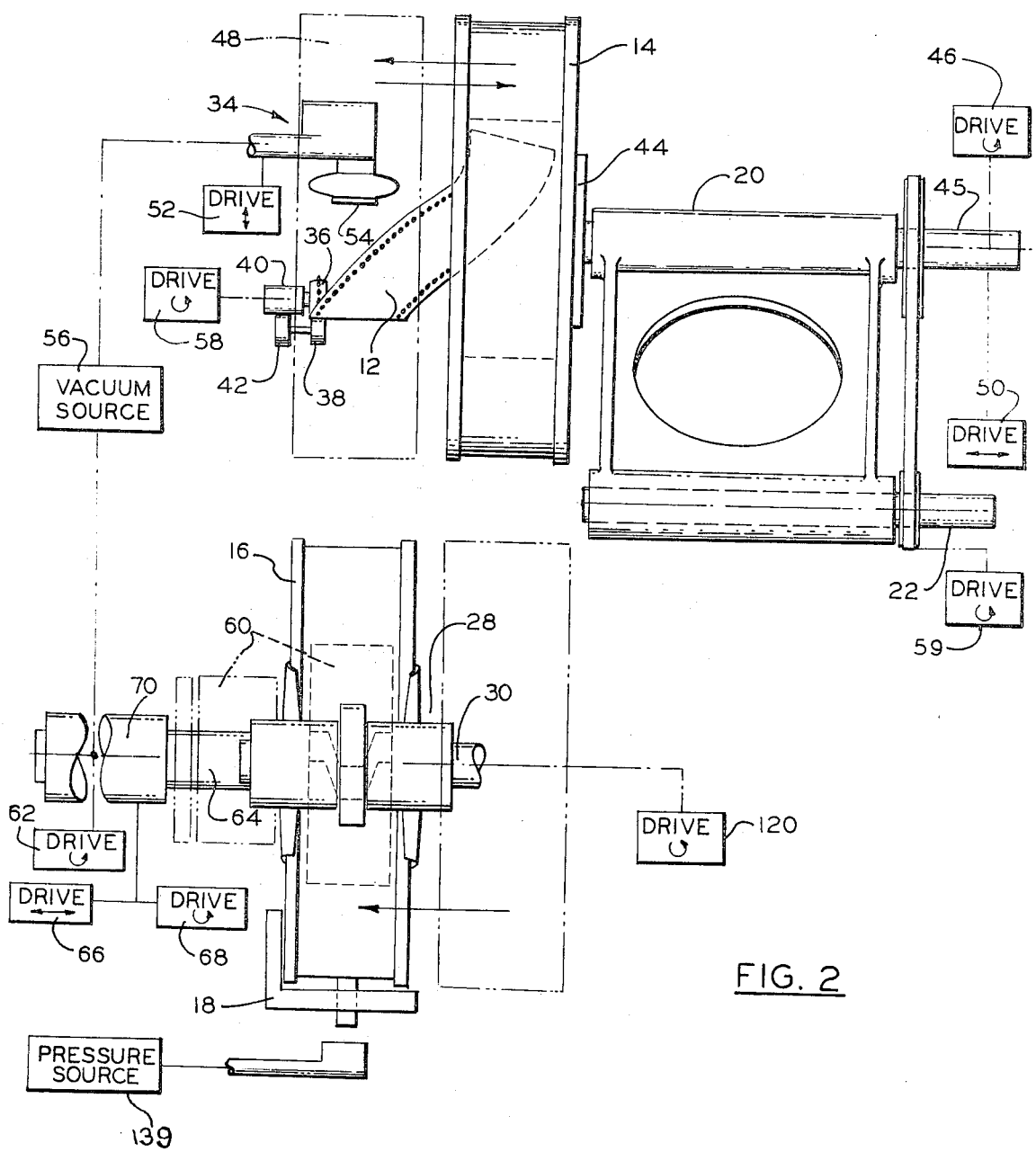
FIG. 2 is an elevational view, at 90° to the FIG. 1 view of certain portions thereof.

Turning now to FIG. 2, additional details of the sequence of operation of the invention may be seen more clearly. Cassette 14 is shown supported in the unwind position by chucking means 44 which is affixed to one end of rotatable shaft 45. The latter is supported in suitable bearing means on the movable end of arm 20 for rotation by rotary drive means 46. Film 12 is shown displaced laterally to the left as it is withdrawn from the inside of the coil in cassette 14. This is accomplished by moving cassette 14 laterally from the unwind position to the position indicated in FIG. 2 by dot-dash block 48, such movement being accomplished by actuation of linear drive means 50, which causes shaft 45 to slide inside arm 20. Vacuum pickup 34 will then be inside the open center of the coil of film within cassette 14. Linear drive means 52 are actuated to move open end 54 of pickup 34 downwardly into contact with the film leader, vacuum is applied by actuation of an appropriate vacuum source 56, and pickup 34 is moved upward by drive means 52. Cassette 14 is then moved back to the normal unwind position by drive means 50 and arms 40 and 42 are moved together to engage between sprocket 36 and roller 38 the film leader held by vacuum pickup 34. That is, a portion of the film leader immediately adjacent the portion engaged by pickup 34 will be positioned between the sprocket and roller upon actuation of the means for rotating arms 40 and 42 toward one another. Rotation of sprocket 36 by rotary drive means 58 and continued rotation of cassette 14 by rotary drive means 46 will serve to thread film 12 into projector 10 in the usual manner. The motion of arm 20 between the solid and dot-dash positions shown on FIG. 1 is accomplished by drive means 59 (FIG. 2) causing arm 20 to rotate about shaft 22.

After film 12 leaves the projector and enters cassette 16 it is wound on rotatable core 60 by application of vacuum from source 56 to the periphery of the core, in a manner to be described. Core 60 may be radially expanded to the diameter shown within cassette 16 and contracted to the diameter shown in the position shown in dot-dash lines through actuation of drive means 62 to rotate inner shaft 64, thereby actuating mechanism described later in connection with FIGS. 7 and 8. Also, the core is laterally movable between the two positions by actuation of linear drive means 66 and rotatable by rotary drive means 68, both acting through outer shaft 70.

Construction and operation of cassette transport means 28 are shown in more detail in FIGS. 3 and 4. Central rod 30 is supported for rotation within hollow shaft 72 by bearing means 74. Nuts 76 and 78 are inserted on oppositely cut threads on rod 30. A pair of gripper members 80 and 82 each include flange portions 84 and 86, respectively, for engaging lips 88 and 90 provided around the side peripheries of each cassette 16, a fragment of cassette 16 being shown in FIGS. 3 and 4. Grippers 80 and 82 also respectively include circular portions 92 and 94 which loosely encircle hollow shaft 72 for sliding support thereon. Screws 96 extend through circular portion 92 into block 98 which is fixedly attached to nut 76 and extends through slotted opening 100 in hollow shaft 72. Circular portion 94 is likewise attached to nut 78 by screws 102 and block 104, the latter extending through slot 106.

Element 108 is provided between grippers 80 and 82 for imparting rotation thereto. Pins 110 and 112 extend fixedly from element 108 through openings slightly larger than the pins in grippers 80 and 82, respectively, and suitable clamp means, a portion of which is shown at 114, are provided to affix element 108 firmly to hollow shaft 72 for movement therewith. Both linear and rotary drive means are provided for hollow shaft 72 and are indicated diagrammatically by the blocks numbered 116 and 118, respectively, in FIG. 3. Shaft 30 is provided with rotary drive means 120. Actuation of linear drive means 116 is effective to cause transporter means 28 to move cassette 16 between the position shown in solid lines in FIG. 2 and an adjacent position wherein cassette 16 has been moved laterally to the position shown in dot-dash lines. Rotary drive means 118 will rotate hollow shaft 72 and element 108, which in turn rotates grippers 80 and 82 by means of pins 110 and 112, to move transporter means 28 about the axis of shaft 30, thereby transporting cassettes between the storage rack and the position of cassette 16 in FIG. 1. Rotary drive means 120 moves nuts 76 and 78 toward and away from one another by virtue of the opposite threads on the shaft 30 and nuts 76 and 78, and restraint from rotary movement by blocks 98 and 104 extending through slots 100 and 106 of hollow shaft 72 which remains stationary during rotation of shaft 30. Thus, grippers 80 and 82 may be moved apart so that flanges 84 and 86 are released from lips 88 and 90 on the cassette, or moved together so that the flanges engage the cassette. Since circular members 92 and 94 have larger inside diameters than the outside diameter of shaft 72, and the openings through which pins 110 and 112 extend are slightly larger than the pin diameters, grippers 80 and 82 are freely movable while shaft 72 and element 108 remain stationary.

Figure 5:
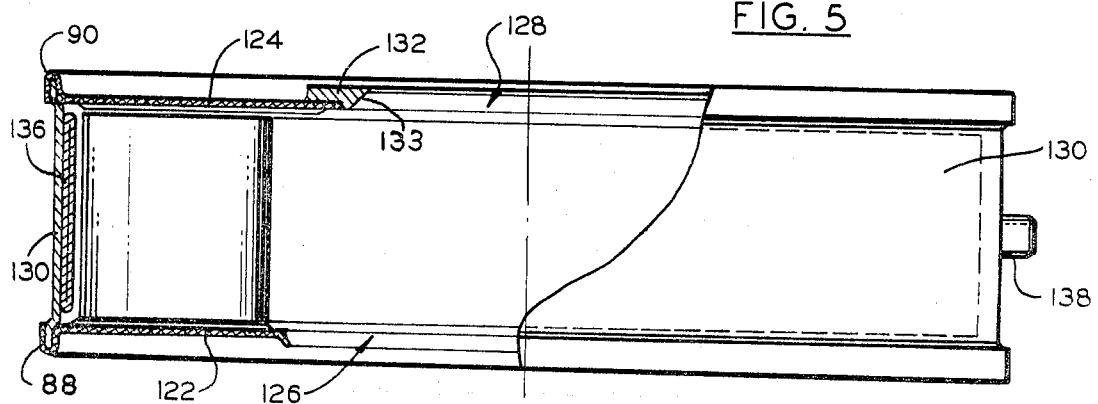
FIG. 5 is a side view, partly in section, of an embodiment of the film cassette.
Figure 6:
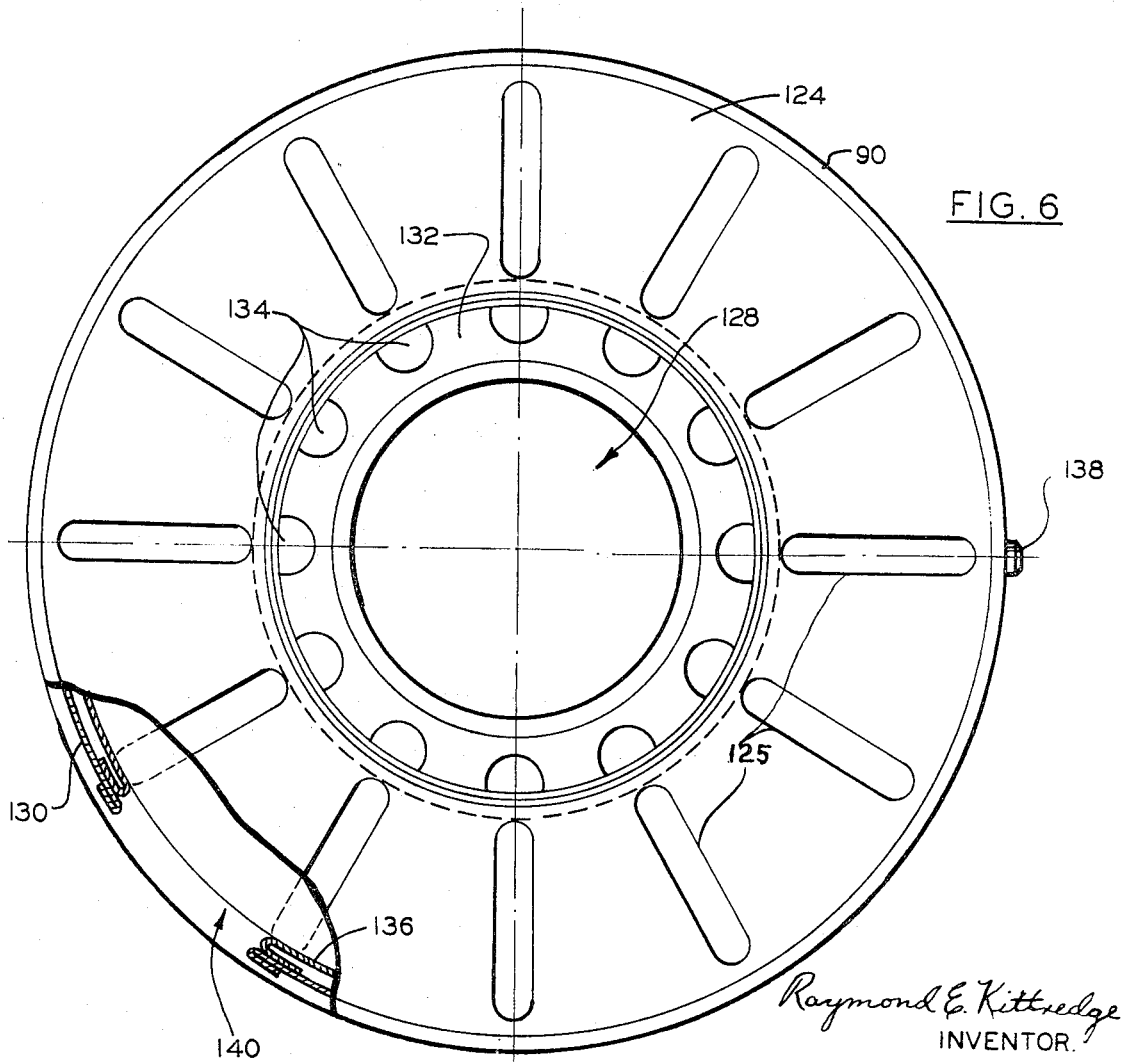
FIG. 6 is an end view, also partly in section, of the cassette of FIG. 5.

The construction of the cassettes 14, 16, and 24 shown in the previous Figures is shown in detail in FIGS. 5 and 6. Two circular side pieces 122 and 124 having openings 125 for lightening purposes are pressed onto a cylindrical support member 130 forming lips 88 and 90 which the grippers may engage. Support member 130 has an opening 140 through which the film may pass to be wound on the core when the cassette is in the takeup position. Side piece 122 has an opening 126 to permit the collapsible core to be inserted into the center of the cassette. Side piece 124 has a similar opening 128 in which is inserted annular member 132 having a bevel 133 and grooves 134 to permit engagement of the cassette by chucking means 44 which translates and rotates the cassette. Mounted on the inside of cylindrical member 130 is inflatable bladder 136 having an inlet valve 138. Valve 138 is a check valve similar to the type used on automobile tires and is supplied with air from pressure source 139 (FIG. 2). When a length of film is completely rewound the bladder 136 is inflated to be firmly engaged between the outside of the film roll and the inside of the cassette thereby holding the film in position after the collapsable core is removed.

Figure 7:
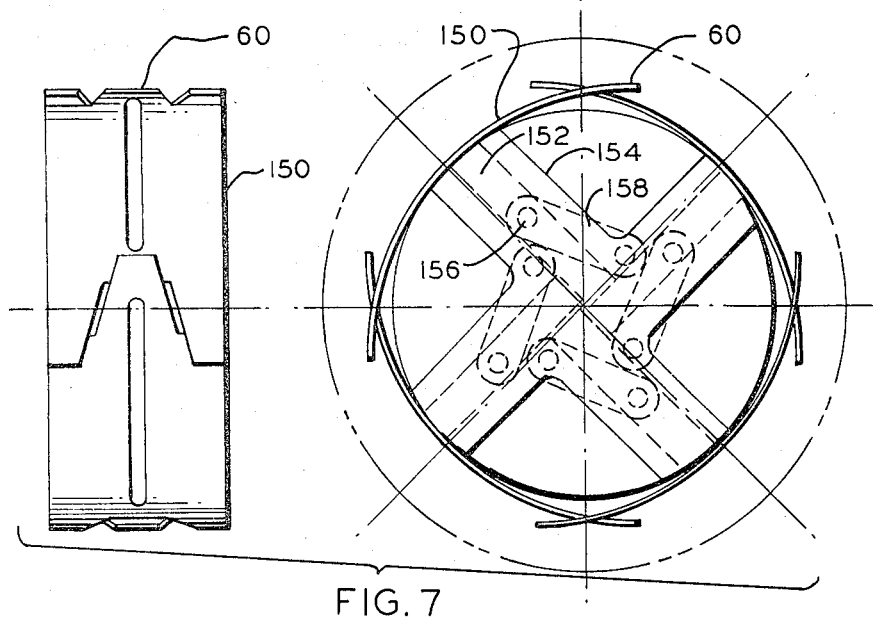
FIG. 7 is a composite view of an embodiment of a collapsible core element shown both from the side and end in a first position.
Figure 8:
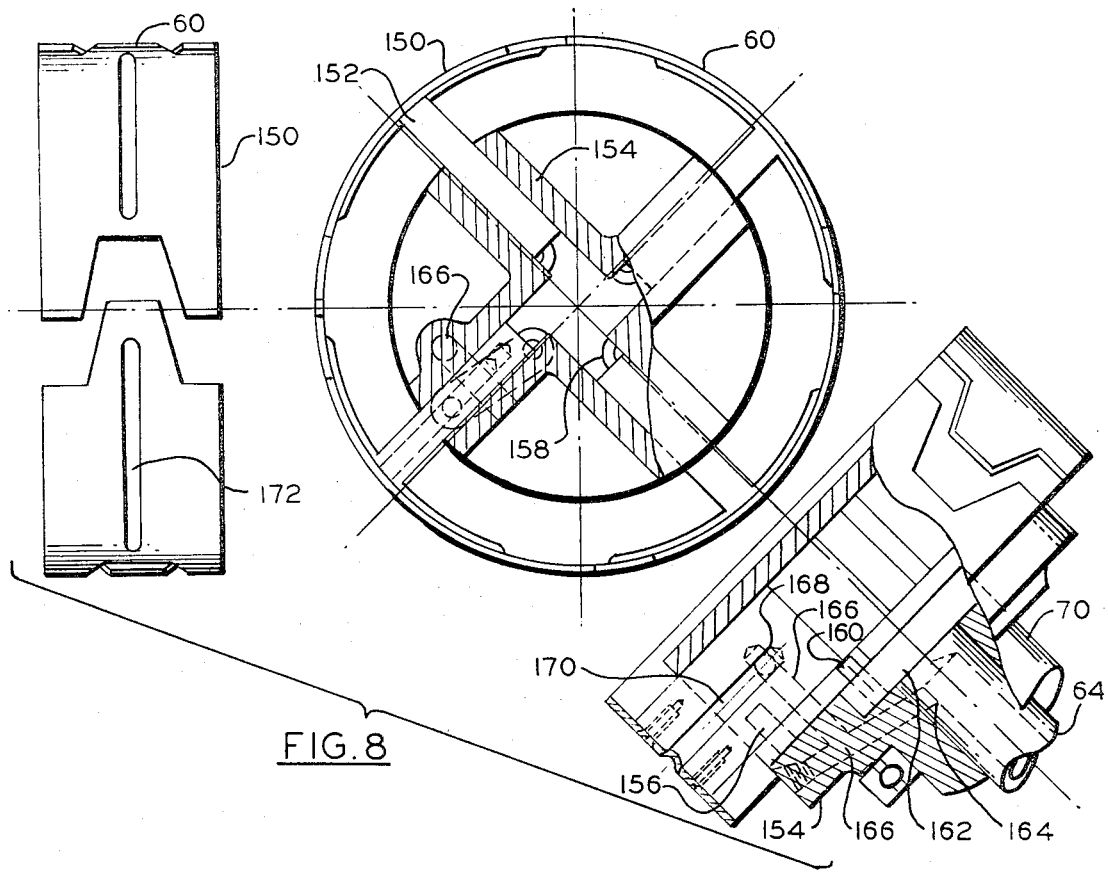
FIG. 8 is a composite view, partly in section, of the collapsible core in a second position.

FIGS. 7 and 8 illustrate a preferred embodiment of the collapsable core 60. FIG. 7 shows the core in its collapsed position and FIG. 8 the core in its expanded position. The periphery of the core comprises four leaves 150 having male and female dovetail ends which interleave when the core is collapsed. Each leaf is mounted on a radially driven slide 152 which is supported by and moves within the central body 154 of the core 60. A crank pin 156 on the slide 152 connects it to a link 158. The other end of the link is connected to crank disc 162 through crank pin 160. Crank disk 162 is at the end of shaft 64 (also shown on FIG. 2) supported inside and coaxial with shaft 70 which is connected to the main body 154. Thus as shaft 64 is turned with shaft 70 stationary, crank disk 162 will move links 158 and slides 152 and leaves 150 will be moved from the position shown in FIG. 7 to that shown in FIG. 8. When in the extended position of FIG. 8 the links 158 are in a toggled position to prevent the core from collapsing as film is wound on it. The manner in which the dovetails are arranged when the core is extended provides good support to the film and prevents the leader from being caught.

When starting to wind film on the core it is necessary to have a means to pick up the leader. This is accomplished by a vacuum introduced through hollow shaft 64. A hole 164 drilled radially in shaft 64 is positioned to match with passage 166 in shaft 70 and the main frame 154. The other end of passage 166 matches up with a hole 168 in one of slides 152 leading to a hollow passage 170 in the slide. This directs the vacuum to the slot 172 in the leaf 150 where it will pick up the leader of the film. When the core is collapsed by turning shaft 64, the vacuum will be removed since the holes 164 and 168 will no longer match with passage 166, and the core may be collapsed and removed without holding onto the leader. Since the bladder will have been inflated as previously mentioned, the film will be held in place.

Figure 10:
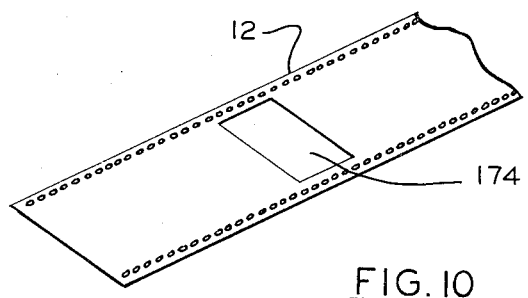
FIG. 10 is a fragment of the leading end of the film.

FIG. 9 shows the pneumatic pickup means 34 of FIG. 2 in detail and FIG. 10 shows the leading edge of film 12 which it must pick up. The film 12 has mounted on it some reflective material 174 such as aluminum foil. When film is to be picked up, drive 50 shown on FIG. 2 moves the cassette to the position shown in dot-dash lines and drive 52 moves the pickup means 34 close to the film. Light from lamp 176 is directed by lens 178 to a point below the center of pickup 34. If the reflective surface 174 is below the pickup, light will be reflected back and will be directed by lens 180 and mirror 182 to photo cell 184. When an output is obtained from photo cell 184 the vacuum from vacuum source 56 on FIG. 2 is applied through tube 186 to flexible rubber cup 188 causing it to pick up the film. When picked up the film is brought into contact with sprocket 36 shown on FIG. 2 and is held in contact by rollers 38 shown on FIG. 1 and FIG. 2. The vacuum is then cut off from source 56 and the pickup means returned to the position shown in FIG. 2 by drive 52. Drive 58 may then drive the film to the threading mechanism of the projector.

Thus, an inherently rewound film handling system has been disclosed. By winding film on a collapsable core and paying it off from the center with the core removed it is possible to immediately use a cassette without further rewinding. Completely automatic operation is accomplished by including film pickup means and providing means to transport cassettes to and from a storage rack and the takeup and payoff positions.

What is claimed is:

1. A motion picture film projection system wherein a coiled length film is supported in a first position for transport into a projector and a second position after passing through said projector and returned to a coiled condition, ready for immediate re-use upon return to said first position, said system comprising:
   a. a first film cassette including movable means for engagement between the interior of the cassette body and the outer circumference of the coil, thereby supporting said film on the outer circumference of the coil in said first position;
   b. film transport means providing a path for said film from the inside of the coil in said first position into said projector for display;
   c. means for rotating the coil in said first position as said film is payed off for transport to said projector from the inside to the outside of the coil;
   d. rotatable core means upon which said film is wound into a coil in said second position;
   e. a second film cassette including movable means for engagement between the interior of the cassette body and the outer circumference of the coil, thereby supporting said film on the outer circumference of the coil in said second position; and
   f. means for removing said core means from the center of the coil after said film is rewound in said second position, thereby leaving an open center and allowing access to the end of said film at the inside of the coil.

2. The invention according to claim 1 wherein said movable means comprises an inflatable bladder affixed to the inside of the cylindrical casing of said cassette.

3. The invention according to claim 1 and further including first cassette transport means for engagement with one of said cassettes and operative to move the latter between said first and second positions and to effect rotation thereof, thereby rotating the film coil, in said first position.

4. The invention according to claim 3 and further including second cassette transport means for engagement with one of said cassettes and operative to move the latter between said second position and a third position remote from said projector.

5. The invention according to claim 4 and further including first vacuum means operative to hold a leading end of said film in contact with said core means to allow said film to be wound upon said core means.

6. The invention according to claim 5 and further including second vacuum means operative to engage the end of said film at the center of the coil when the latter is in said first position and position said end for engagement by said film transport means.

7. The invention according to claim 6 and further including means associated with said end of said film in said first position for activating said second vacuum means to engage said end.

8. The invention according to claim 7 wherein said second vacuum means include photosensitive means and said means associated with said end comprise a reflective material.

* * * * *